United States Patent [19]

Craig et al.

[11] Patent Number: 4,508,677

[45] Date of Patent: Apr. 2, 1985

[54] MODULAR NUCLEAR REACTOR FOR A LAND-BASED POWER PLANT AND METHOD FOR THE FABRICATION, INSTALLATION AND OPERATION THEREOF

[75] Inventors: Edwin R. Craig; Ben Blumberg, Jr., both of San Jose, Calif.

[73] Assignee: General Electric Company, San Jose, Calif.

[21] Appl. No.: 465,309

[22] Filed: Feb. 9, 1983

[51] Int. Cl.³ .................. G21C 1/32; G21C 13/02
[52] U.S. Cl. ............................. 376/174; 376/171;
376/245; 376/260; 376/293; 376/294; 376/298;
376/299; 376/402; 376/406; 376/909
[58] Field of Search .............. 376/171, 174, 293, 403,
376/404, 405, 406, 909, 912, 290, 299, 287, 289,
298, 292, 295, 296, 245, 260, 294, 402; 52/245,
249, 378

[56] References Cited

U.S. PATENT DOCUMENTS

| | | | |
|---|---|---|---|
| 3,127,321 | 3/1964 | Borst | 376/909 |
| 3,170,846 | 2/1965 | Blumberg, Jr. | 376/393 |
| 3,245,879 | 4/1966 | Purdy et al. | 376/283 |
| 3,255,088 | 6/1966 | Sprague et al. | 376/203 |
| 3,397,114 | 8/1968 | Deighton | 376/405 |
| 3,401,082 | 9/1968 | Ammon et al. | 376/204 |
| 3,830,695 | 8/1974 | Sauvage | 376/290 |
| 3,888,730 | 6/1975 | Jackson | 376/290 |
| 3,941,187 | 3/1976 | Jabsen et al. | 376/402 |
| 3,985,614 | 10/1976 | Jungmann | 376/293 |
| 4,124,064 | 11/1978 | Jabsen et al. | 376/402 |
| 4,289,196 | 9/1981 | Jabsen et al. | 165/83 |
| 4,294,658 | 10/1981 | Humphreys et al. | 376/171 |
| 4,355,001 | 10/1982 | Pierart | 376/909 |

OTHER PUBLICATIONS

Kliman, Gerald B., "Large Electromagnetic Pumps," *Electric Machines and Electro Mechanics: An International Quarterly*, vol. 3, pp. 129-142, (1979).

*Primary Examiner*—Harvey E. Behrend
*Assistant Examiner*—Richard W. Wendtland
*Attorney, Agent, or Firm*—Ivor J. James, Jr.; Raymond G. Simkins; Samuel E. Turner

[57] ABSTRACT

A self-contained modular nuclear reactor which can be prefabricated at a factory location, nuclear-certified at the factory, transported to a field location for final assembly and connection to a large-scale electric-power generating facility. The modular reactor includes a prefabricated nuclear heat supply module and a plurality of shell segments which can be assembled about the heat supply module and which provide a form for the pouring and curing of a cementatious biological shield about the heat supply module. The modular reactor includes passive shutdown heat removal systems sufficient to render the reactor safe in an emergency. A large-scale power plant arrangement is disclosed which incorporates a plurality of the modular reactors.

19 Claims, 14 Drawing Figures

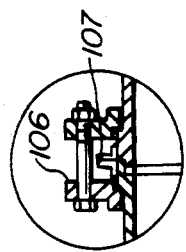
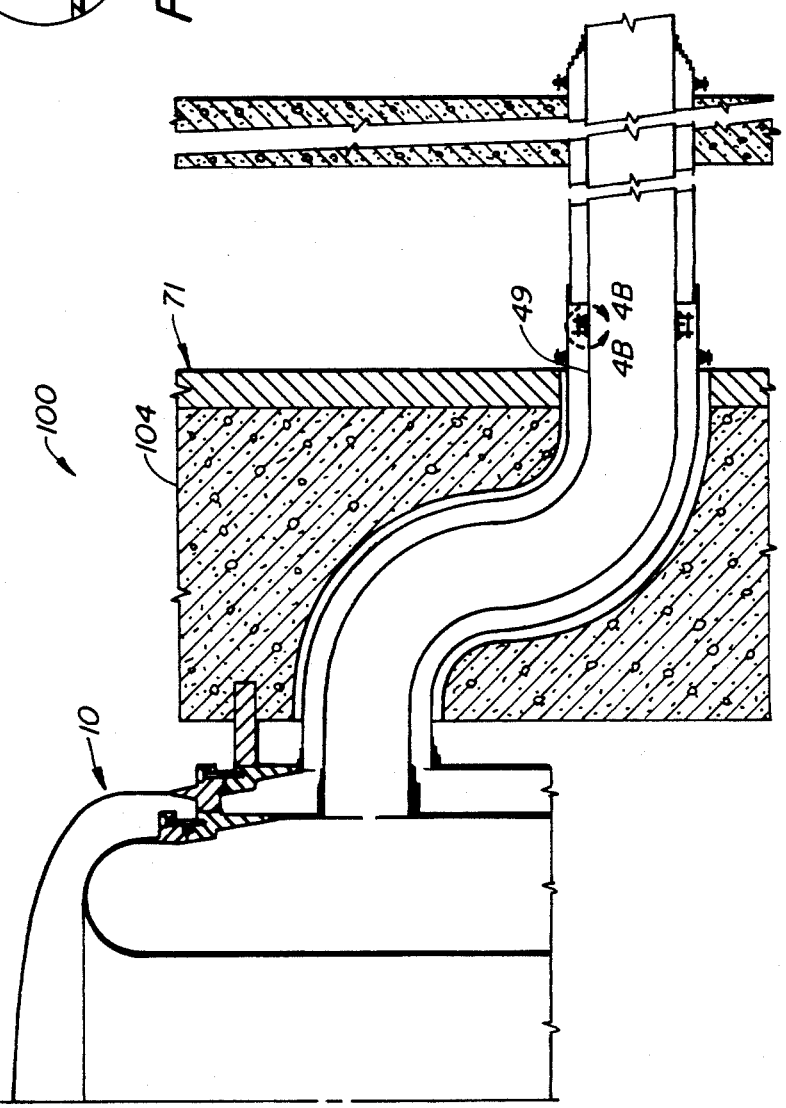

○ INNER CORE FUEL ASSEMBLY
⊙ OUTER CORE FUEL ASSEMBLY
Ⓟ PRIMARY CONTROL ROD
Ⓢ SECONDARY CONTROL ROD
⬣ FERTILE FUEL ASSEMBLY
⬢ REFLECTOR

4,508,677

MODULAR NUCLEAR REACTOR FOR A LAND-BASED POWER PLANT AND METHOD FOR THE FABRICATION, INSTALLATION AND OPERATION THEREOF

This invention relates to nuclear reactors for large-scale energy generation. In particular, a self-contained nuclear heat supply module is disclosed which is fabricated at a factory and which is assembled at a field location to form a nuclear reactor. The reactor module is shown in its factory construction, in its on-site assembly, and in the operation of the assembled power plant.

PRIOR ART

Typical nuclear reactor construction includes a heat supply containing a nuclear fuel, a primary coolant system, and a secondary coolant system. The primary coolant receives heat from the nuclear heat supply and delivers the received heat to the secondary coolant through a heat exchanger. The heat of the secondary coolant is delivered to a means for generating electricity, such as a steam turbine. For commercial energy generation nuclear generating facilities are typically large installations including one or more independent nuclear reactors, each of which can have an installed capacity as large as 1200 megawatts. Such reactor systems are typically housed within large containment buildings, which enclose the reactor and auxiliary and backup cooling and control systems as well as such facilities for refueling and servicing the reactor as will be needed over the lifetime of the plant. The containment building must, of course, be designed for entry by humans for servicing and refueling operations.

Aside from the large-scale nuclear reactors intended to power commercial energy-generating plants, small-scale nuclear reactors have also been designed to operate in an entirely different environment—namely, aboard ship. A nuclear generating plant for shipboard use must necessarily be more compact than a land-base plant, but the power requirements are much less. Various designs for compact nuclear generating units suitable for shipboard use are disclosed in U.S. Pat. Nos. 3,170,846; 3,245,879; 3,255,088; 3,401,082; 3,941,187; 4,124,064; and 4,288,196. In the reactor units disclosed in these patents, the reactor core is contained within a close-coupled pressure vessel and containment vessel. For compactness a boiler or steam-generating unit is frequently included within the containment vessel. In typical shipboard construction the containment vessel and associated shielding are permanently assembled within the steam-generator compartment of the ship. The reactor core and associated cooling and heat-exchange systems are then lowered into the containment vessel. A nuclear generating unit for shipboard use must, accordingly, be constructed with the reactor core, steam-generating unit, heat exchangers and the like mounted so that they can all be removed through the top of the containment vessel for servicing and refueling.

In contrast to the compact shipboard operating units, land-based nuclear power plants were initially constructed on a large scale because it was believed they would achieve an economy of scale. Basic geometrical considerations teach that as the reactor volume increases, the ratio of the reactor surface area to the reactor volume decreases, so that greater energy generation capability was expected per unit of shielding, cooling system, and containment vessel which had to be constructed. Simply stated, as the plant became larger, it was expected that the marginal amount of time, money, and effort devoted to the containment vessel, confinement building, site operating personnel and other necessary services would generally decrease.

Unfortunately, these expectations have not generally been borne out in practice. Recent events have demonstrated that an unscheduled shutdown of one such unit can have very substantial economic consequences. Where a large reactor suffers radioactive contamination, plant capacity suffers substantially and cleanup costs conceivably outweigh the benefit otherwise derived from use of a nuclear fuel.

Furthermore, government-imposed safety regulations require that nuclear power plants be constructed to the highest possible standard. With current construction methods this high standard must be "transported to" the remote construction sites in which nuclear plants are commonly located and imposed on construction operations in the field. Recruiting construction personnel and training them in the field to the high and exacting standards of modern nuclear licensing procedures has proved expensive, time-consuming, difficult—and sometimes impossible. In short, with current construction methods, quality assurance has been a problem.

As it is ultimately disposed within a large nuclear energy-generation facility, the reactor relies upon active safety measures in the event of substantial malfunction. These measures include active heat rejection systems oftentimes coupled to auxiliary or backup systems through extensive piping networks. The integrity of such piping networks and their associated pumping stations during unpredictable seismic events has oftentimes been questioned.

Additionally, such plant designs have essentially been unalterable once the plant is placed on-line. Plant capacity is fixed within a prescribed range for economical operation, making nuclear plants suitable for only large-scale base load power generation. A plant shutdown means complete interruption of base load enery supply.

Finally, all such plants must be over-designed in an attempt to withstand possible malfunctions and must be repeatedly inspected for flawed components by X-ray techniques and the like to assure continued safety against such malfunctions.

Some of the above-cited U.S. patents suggest that compact nuclear generating units may also play a role in land-based energy generation. U.S. Pat. No. 4,289,196, in particular, suggests that a number of auxiliary systems associated with typical land-based reactors can be eliminated if multiple small-scale modular nuclear steam generating units are connected to a single turbine for generating electricity.

SUMMARY OF THE INVENTION

The present invention efficiently merges into a large-scale land-based energy generating facility the concept of a compact nuclear generating unit. The invention provides a method by which all the critical elements of the compact nuclear generating unit are constructed and assembled at a central factory location, transported to a field location, outfitted with a biological shield, and incorporated into the generating plant. In particular, the invention provides a prefabricated nuclear heat supply module which includes all critical nuclear components of the compact generating unit and which can be completely nuclear-certified at the central factory and incorporated into the generating plant with only minimal non-critical assembly in the field.

Briefly, the nuclear heat supply module as assembled at the factory includes the primary vessel which is surrounded by an outer vessel close-coupled to the primary vessel to define an interstitial region between the two for containing an inert gas. The outer vessel has dimensions which are sized to enable the factory-assembled module to be shipped on a railway car. An unloaded reactor core unit including a plurality of control rods is mounted within the primary vessel. For compactness without sacrificing power output, the reactor core unit is of the fast-breeder type. Also mounted within the primary vessel is a heat exchanger having an inlet and outlet for secondary coolant. Inlet means and outlet means are provided for communicating to the outer and primary vessels with the heat exchanger inlet and outlet. The inlet means and outlet means are adapted to be connected to the balance of a conventional secondary cooling system, which is constructed at the field location. A pump is mounted within the primary vessel for pumping a primary coolant through the reactor core unit and heat exchanger. The pump and the reactor core unit communicate directly with an inlet plenum so as to define a primary coolant flow path directly from the pump to the reactor core unit. Means are also provided within the primary vessel for defining a plenum-like primary coolant flow path from the reactor core unit to the heat exchanger and from the heat exchanger to the pump, the flow-path-defining means being contained entirely within the primary vessel and including no piping subject to leakage or rupture. A control rod drive unit is mounted within the outer vessel overlying the reactor core unit and is operatively connected through the primary vessel to the control rods within the reactor core. It is an object of the invention to provide a prefabricated nuclear heat supply module which contains within all critical nuclear components which are subject to compulsory nuclear-certification procedures, so that a fully certified module can be factory-produced and shipped to the generating plant field location.

It is a feature of the invention that the nuclear heat supply module, as it leaves the factory, is sized especially to be transported on a conventional railway car. After the module is unloaded from the railway car at the field site, a segmented surrounding cylindrical shell is assembled about the module. Each segment of the shell defines an interstitial region for the pouring and curing of a concrete biological shield. Each segment also includes a plurality of passive, free-convection cooling loops, providing a shutdown heat-removal system.

Shell assembly and pouring and curing of a cementatious biological shield is performed on a movable pad, for example, an airlift pad, and a concrete shield seal plug is poured at this time. In the referred plant design the assembled module with concrete shield is moved to a service building wherein the outer vessel head and primary vessel head are removed enabling the reactor core to be charged in a conventional open-head manner. The heads are then bolted and hermetically seal-welded in place, and the concrete biological seal plug is installed. The assembled and charged module is then moved into position for connection to a conventional steam generation circuit.

OTHER OBJECTS, FEATURES AND ADVANTAGES

An object of this invention is to provide a nuclear heat supply module which can be assembled at a factory location and thereafter shipped by railroad to a plant site in the field. Simply stated, maximum construction of the reactor occurs at the factory with minimum assembly occurring at the plant site. This disclosure hereafter sets forth: the reactor construction in the plant; the reactor module structure which is shipped from the factory; the process of shielded reactor assembly at the plant site; the resultant reactor at the plant which comprises a discrete steam generation unit; and an overall plant layout adapted to accommodate on a permanent site of infinite life the reactor disclosed herein.

It is an object of the invention to disclose the construction of a nuclear heat supply module in which as many assembly steps as possible can be carried out in a factory under controlled condition by trained workers.

An advantage of the disclosed apparatus is that where assembly occurs at a factory, quality assurance can be maximized. Critical nuclear components can be intimately inspected and verified before licensing. Proceeding in this manner, greater inspection can be carried out in a central location, thereby providing for more reliable certification with reduced administrative costs.

Yet another advantage of the disclosed assembly of components is that the efficiencies of factory automation can be enjoyed. In effect, an almost completely hermetically sealed primary loop is shipped from the factory, with the primary-coolant pumps already installed in position. Only a minimum number of seal welds must be made on-site to complete the hermetic seal of the primary vessel after loading of the fuel assembies and charging of the interstitial regions with inert gas.

Another object of the invention is to provide for easy assembly of a biological shield about the nuclear heat supply module at the field site. According to this aspect of the invention, a four-segment upstanding cylindrical annular shell is prefabricated at the factory and shipped to the site. The shell has discrete, vertically extending, serpentine free-convection loops mounted preferably eight to a shell segment. The inner, heat-receiving branches of each loop are in intimate contact with the outer vessel, and the heat-dissipating branches of each loop are exterior to the shell.

According to one embodiment of the invention, the inner coolant branch of the shutdown heat removal circuits adjacent the outer vessel are supplemented with a water jacket vented to atmospheric pressure, which provides for greater passive heat removal capability in the event of shutdown. Venting the water jacket to the atmosphere assures that in the event of convective loop failure, the biological shield will not be exposed to temperatures above the boiling point of water so as to destroy the concrete. The jacket is conveniently refillable to provide for continual heat-removal capability in the event of total system failure.

A further object of this invention is to provide a process of charging and refueling the reactor core unit. According to this aspect of the invention, the nuclear heat supply module with biological shield in place is transported to a service building. A concrete plug capping the biological shield is removed, followed by removal of the outer vessel head and primary vessel head. A conventional open-head charging or refueling operation is then carried out within the on-site service building after which the heads are re-attached and re-sealed to their respective vessel bodies. The biological shield cap is then re-positioned and the charged reactor module is transported to its operating location whereupon the secondary coolant inlet and outlet means are connected to the balance of the secondary cooling system.

The disclosed process results in a steam generation unit of high integrity. All critical components of the reactor module are assembled without piping. Only the necesary flow of the intermediate heat exchanger occurs through a piping network, and that is exterior to the nuclear module.

The disclosed module design takes advantage of the improved scram performance provided by gravity-actuated primary and secondary control rods to render the unit subcritical.

No feedwater cooling or other active cooling system is relied upon in a scram condition. Instead the scrammed reactor is entirely passive providing for the dissipation of heat to the atmosphere through the free-convection coolant loops integrally included within the biological shield.

An additional advantage of the disclosed construction is that the reactor module itself with its massive biological shield provides an ambient heat sink significantly contributing to the module's passive shutdown capability.

An additional advantage of the invention is that during operation the shutdown heat-removal system accounts for less than three-tenths of a percent of the loss of the total reactor heat. The minimal heat loss through the shutdown system is sufficient to provide a continual flow in the sealed free-convection loops so as to maintain them in an operative condition, yet it does not reduce significantly the useful heat carried by the secondary coolant.

The dimensions of the prefabricated nuclear heat supply module specifically set forth herein are directly related to the utility of the invention. The smaller reactor modules of the present invention taken in combination with one another render a significantly safer, more economical nuclear power plant which can be more thoroughly subjected to nuclear-certification procedures. The smaller units are amenable to the free-convection shutdown heat-removal loop disclosed herein for energy dissipation upon a scram condition. Moreover, a smaller unit can be constructed to take advantage of the thermal expansion of core material so as to aid in bringing the reactor to a subcritical disposition in the event of shutdown. Not only can a smaller unit be substantially assembled at the factory and charged at the field site, but additionally when subjected to casualty at the field site, it forms a manageable unit which can simply be moved away from the installation and left to cool down while the remainder of the plant continues to operate.

The nuclear heat supply module achieving the above results will preferably be 14 feet in diameter and 70 feet in height. A nuclear heat supply module of these dimensions can be conveniently shipped to the field site on a conventional railway car. The unit assembled in the field with biological shield is 30 feet in diameter and 80 feet in height. The unit can be transported on a conventional air-lift pad and detachably connected to a steam generation system.

An advantage of the disclosed reactor is that in the event of casualty, it can easily be moved off-site to an isolated area. The site is thus furnished with effectively infinite lifetime. The fuel elements can then be removed from the isolated reactor, or alternatively the reactor can be left intact for a radioactive decay period or more and then the fuel elements removed.

Other objects, features and advantages of this invention will become more apparent after referring to the following specification and attached drawings in which:

FIG. 1 is composed of FIGS. 1A and 1B, which taken together provide a cutaway perspective view of an assembled nuclear heat supply model with biological shield acording to the invention.

FIG. 4A is sectional view of a portion of the containment vessel, confinement vessel, and biological shield showing the interface of the secondary coolant outlet means with the balance of the secondary cooling system;

FIG. 4B is an enlargement of a portion of FIG. 4A showing the sealed connection of the coolant inlet and outlet means with an external duct of the secondary cooling system;

Figure 7A:
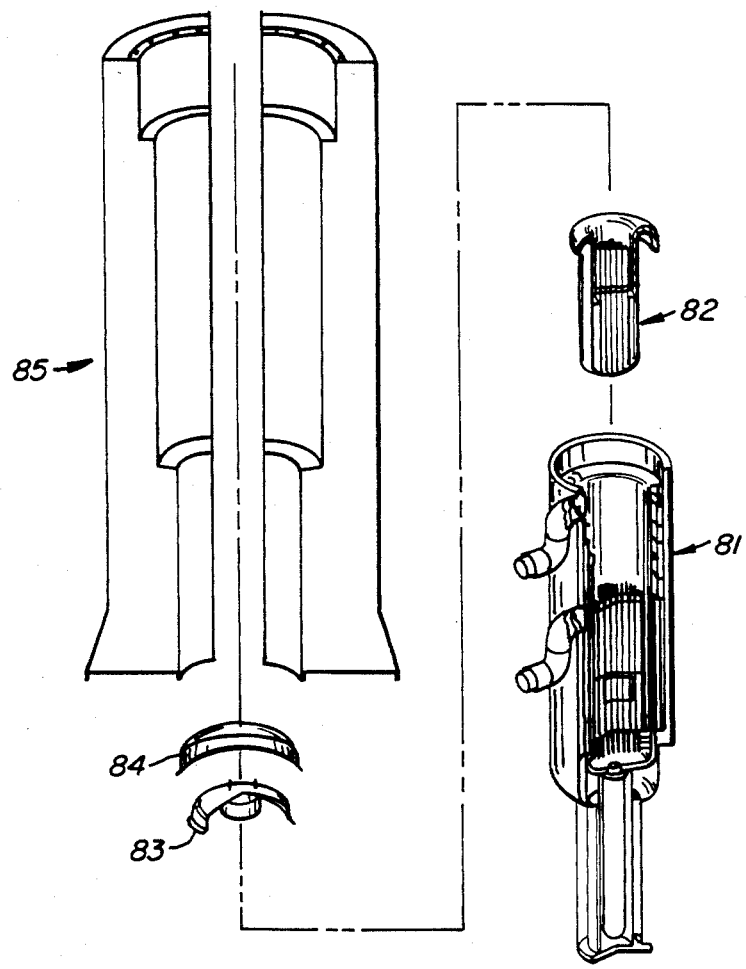
Figure 7B:
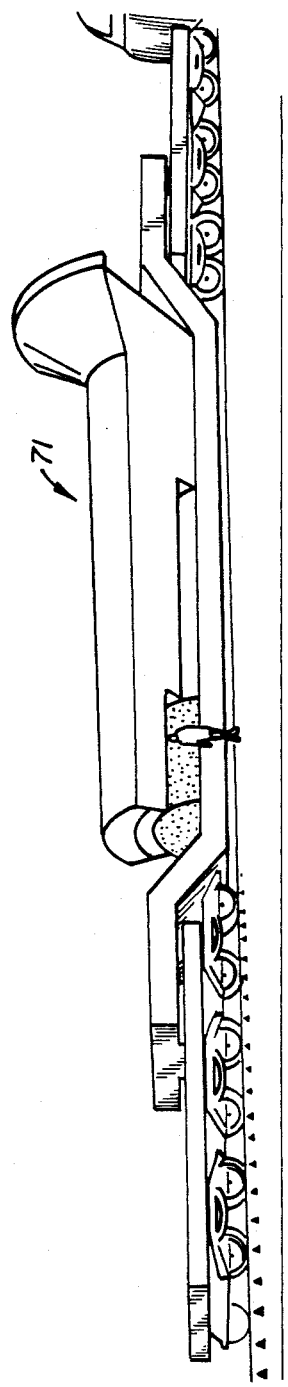
Figure 7C:
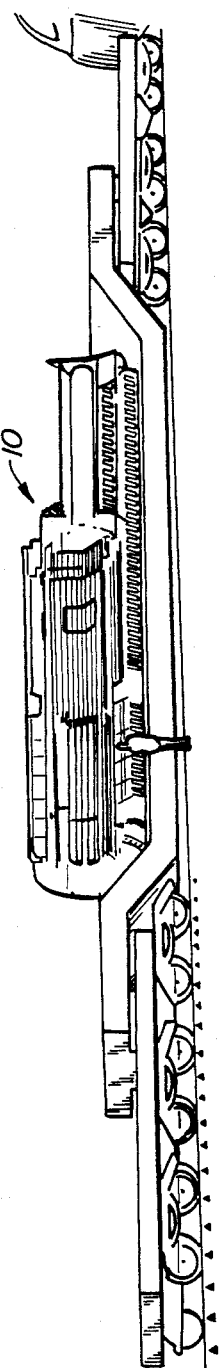
Figure 7D:
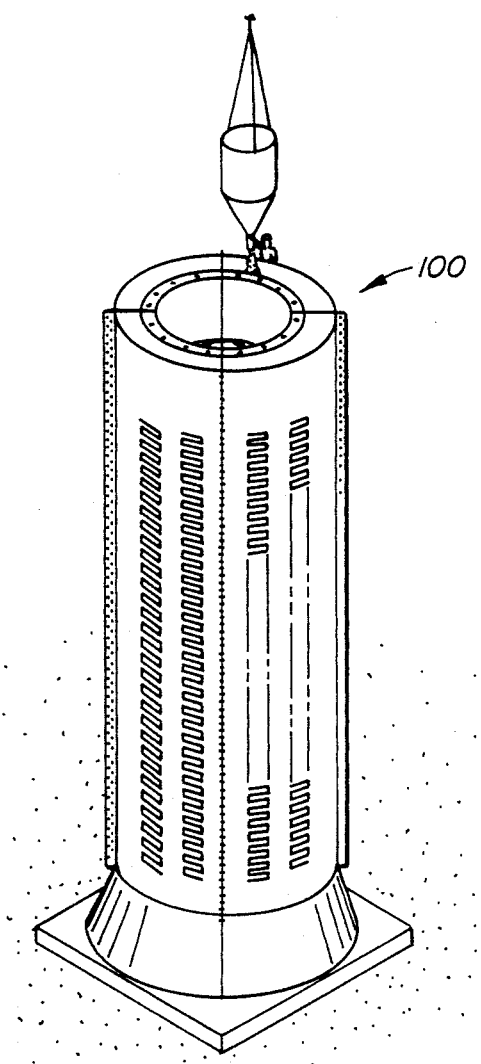
Figure 8:
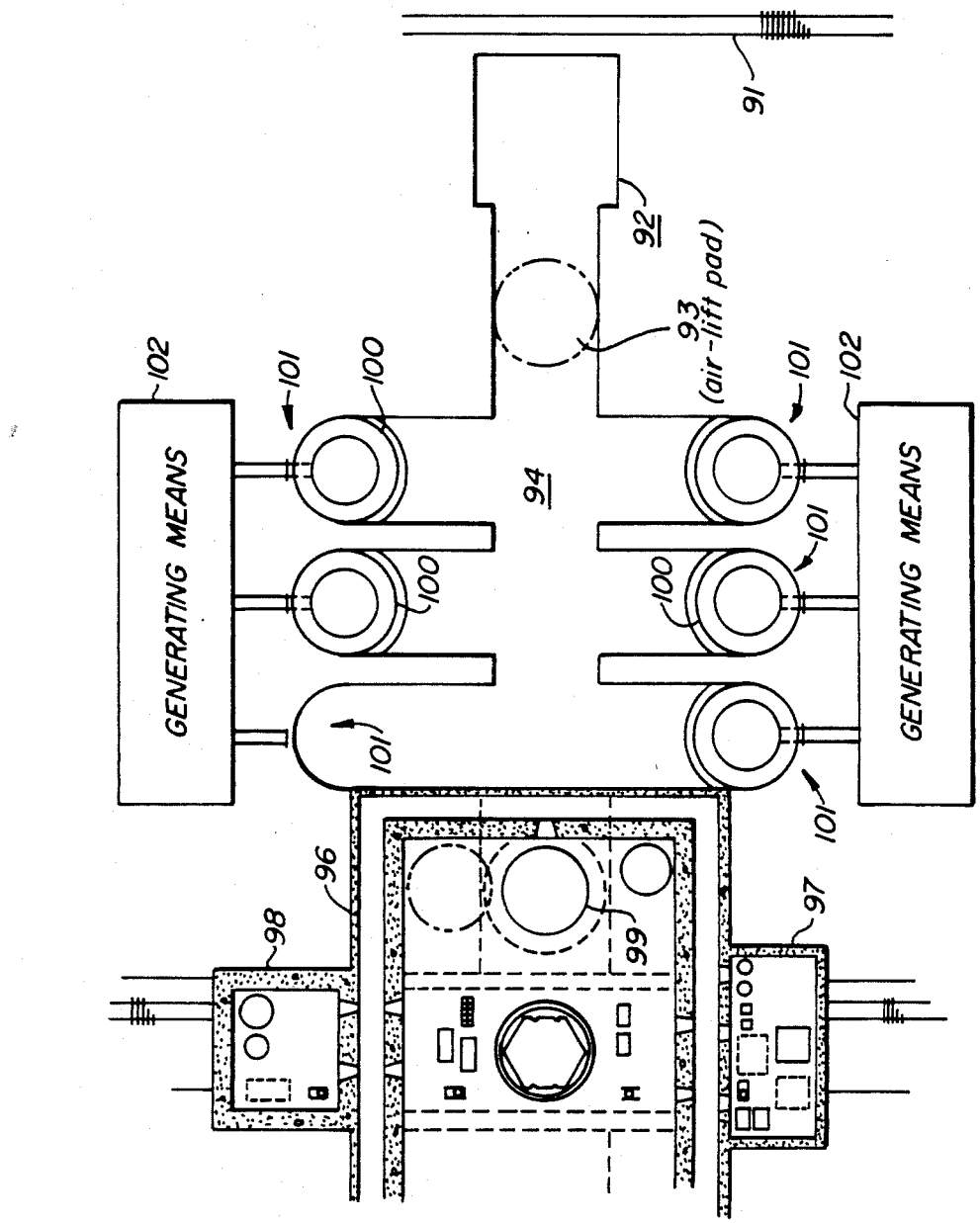
Figure 9:
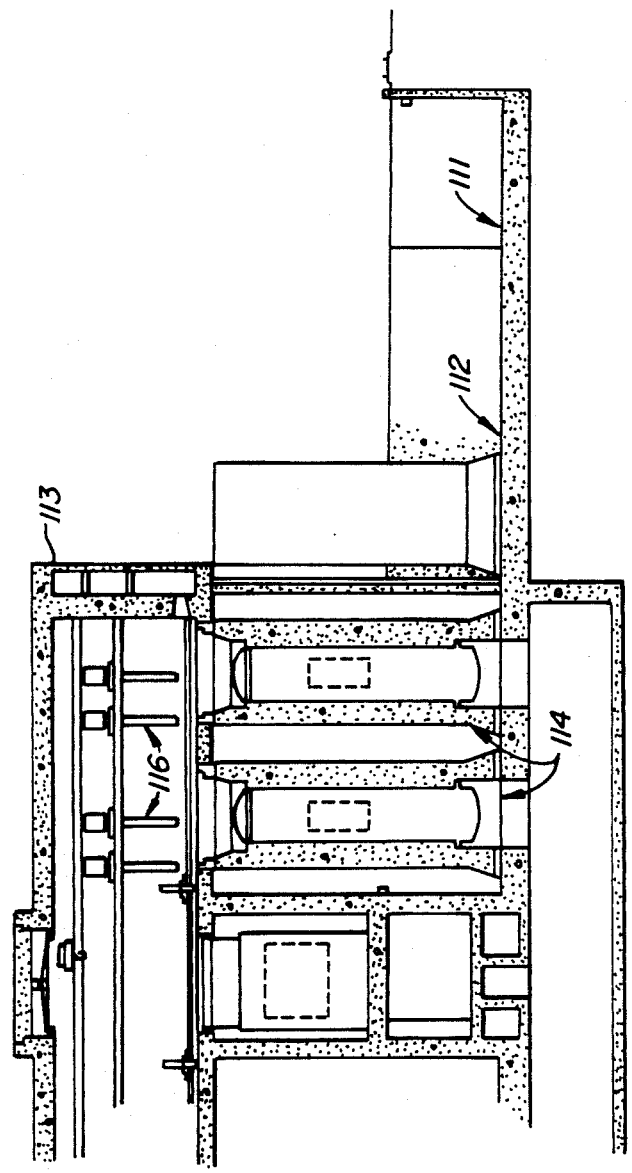

FIGS. 7A–7D provide a cartoon series illustrating the stages of construction of a modular nuclear reactor unit, beginning with a nuclear heat supply module produced at a factory and ending with a modular reactor unit fully assembled with biological shield as it would to appear at a field location. FIG. 7A provides an idealized exploded view of a nuclear heat supply module assembled at a factory together with the segmented shells used in forming the concrete biological sheild;

FIGS. 7B and 7C are perspective views showing a shell segment and the nuclear heat supply module being shipped by railway to a field location;

FIG. 7D is an idealized perspective view of a modular reactor unit erected on a movable air-lift pad at the field location with the segmented shell in place and concrete being poured to form the biological shield;

FIG. 8 is a plan view showing a layout for a power plant utilizing the modular reactor units of the present invention; and FIG. 9 is an elevational view of an alternative power plant arrangement utilizing the modular reactor unit of the invention.

DETAILED DESCRIPTION OF PREFERRED EMBODIMENT

Figure 1A:
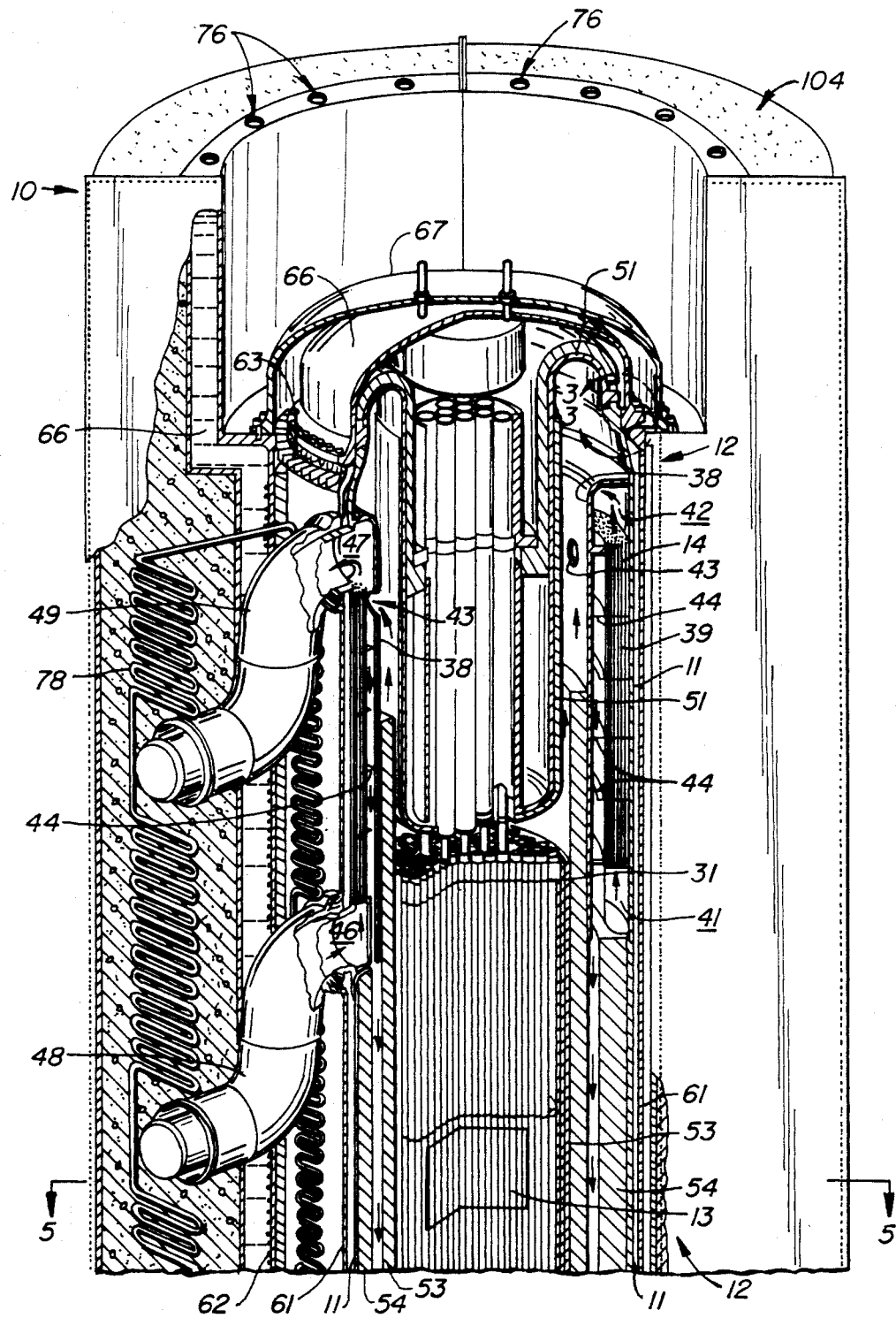
FIG. 1A shows the upper portion of the module and FIG. 1B shows the lower portion thereof.
Figure 1B:
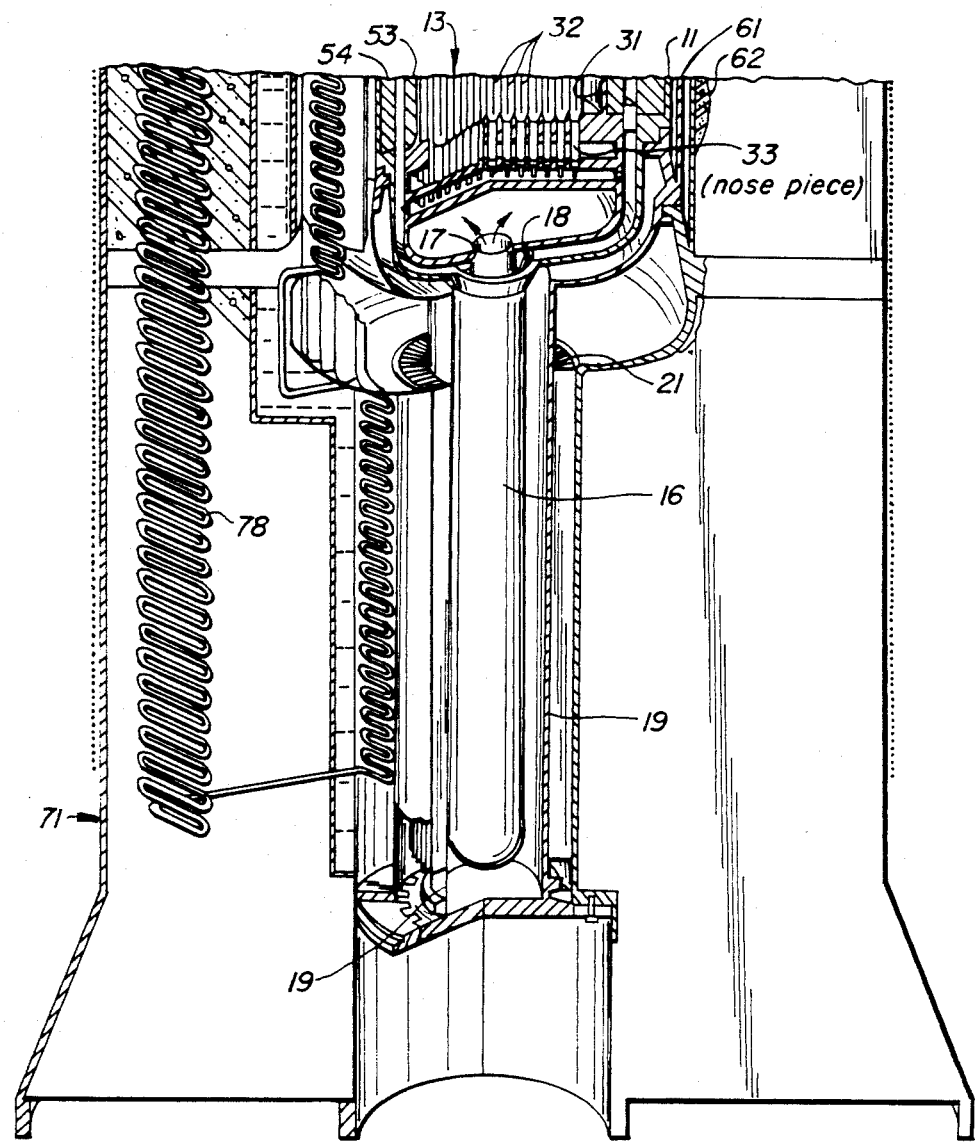

The invention provides a modular large-scale nuclear energy-generating facility, in which the total energy source is provided by a plurality of compact modular nuclear reactor units. FIGS. 1A and 1B taken together illustrate one such unit. The compact nuclear reactor unit 10 includes a nuclear heat supply module, which is prefabricated at the factory and shipped to the field location, and a surrounding biological shield, which is constructed at the field location.

The factory-constructed nuclear heat supply module comprises a primary vessel 11 and an outer vessel, indicated generally at 12, surrounding the primary vessel 11. Included within the primary vessel are a reactor core unit 13, a heat exchanger 14, the entire primary cooling system and a portion of the secondary cooling system. The secondary coolant inlet and outlet provides the only fluid communication with the nuclear heat supply module when it is in its operative condition. It is a feature of the invention contributing to the safety of the assembled reactor that the primary and secondary cooling systems include no piping within the heat supply module, which could be subject to breakage with possible catastrophic consequences.

The preferred embodiment of the nuclear heat supply module uses a primary cooling system design having characteristics of a pool-type reactor. The primary coolant, for example, liquid sodium, is circulated by pump 16 having a central high-pressure discharge duct 17 surrounded by an annular intake 18. For liquid metal coolants pump 16 is preferably an electromagnetic pump. Such pumps are well known and are described, for example, in an article by Gerald B. Kliman entitled "Large Electromagnetic Pumps," *Electric Machines and Electro Machines: An International Quarterly*, Vol. 3, pp. 129–142 (1979). The pump 16 sits within a heat transfer vessel 19. Heat transfer from the vessel 19 is enhanced by a system of fins 21, half of which project outwardly from the outer cylindrical wall of vessel 19 and the other half of which project inwardly from the inner cylindrical wall of primary vessel 11 in interleaved relation with the outwardly projecting fins. The surfaces of the fins are provided with high-emissivity coatings for enhanced radiative heat transfer, which is important for effective shutdown heat-removal capability described hereinbelow. For the system illustrated in FIG. 1 using a liquid sodium coolant the pressure head at the pump intake 18 is approximately 20 psig, and the developed head at the pump discharge 17 is approximately 180 psig.

Figure 2:
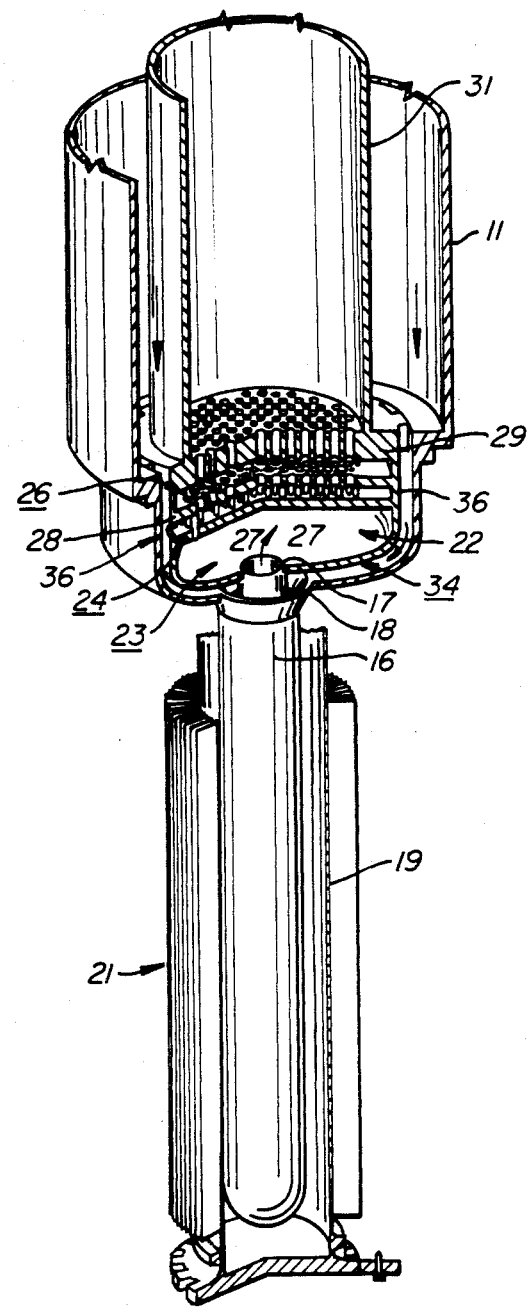
FIG. 2 is a cutaway perspective view of an inlet plenum structure for primary coolant communication with the reactor core unit in accordance with the invention.

The primary coolant is circulated from the high-pressure discharge 17 of pump 16 upwards through the reactor core unit 13. Contributing to the compactness of the structure is the design of the inlet plenum 22, which enables pump 16 to circulate the primary coolant directly into the reactor core unit 13 without the need for intervening inlet modules. The structure of inlet plenum 22 can best be seen in FIG. 2. In the preferred embodiment utilizing a single centrally situated circulating pump 16, inlet plenum 22 comprises a primary chamber 23 and two distribution chambers 24 and 26, chamber 24 being a low-pressure chamber and chamber 26 being a high-pressure chamber. Primary chamber 23 is in fluid communication with high-pressure chamber 26 through a plurality of small tubular members 27. High-pressure chamber 26 is separated from low-pressure chamber 24 by perforate plate 28. Overlying perforate plate 28 and forming the upper wall of high-pressure chamber 26 is a perforate support plate 29, which provides support for reactor core unit 13 which sits within a cylindrical core barrel 31. To support the weight of the core, the support plate 19 is preferably 12 inches thick and is itself supported by radial webs joining the primary vessel wall. The perforations of support plate 29 are registered with the perforations of plate 28. The reactor core unit is comprised of a plurality of fuel assembly ducts 32, as will be described in more detail herein below. Each duct 32 seats on a perforation of core support plate 29 and terminates in a nose piece 33. Each nose piece 33 is of a generally tubular shape and extends through a respective perforation in support plate 29 and seats on the underlying perforation of plate 28. Each nose piece 33 is sealed at its bottom extremity and has a plurality of orifices around its circumference within high-pressure chamber 26. In this manner each nose piece acts as a coolant-receiving member to provide fluid communication between chamber 26 and the fuel assembly duct associated with the nose piece. An annular interstitial region 34 is defined by the outer wall of primary chamber 23 and a second wall spaced apart therefrom. The interstitial region 34 provides a low-pressure return path and suction plenum for pump intake 18. Low-pressure chamber 24 is in fluid communication with the low-pressure region 34 through a plurality of angularly spaced orifices 36 in the sidewall of chamber 24.

A separate primary chamber 23 and distribution chambers 24 and 26 are called for in the preferred embodiment because of the central location of pump discharge 17. The extra distribution chambers are necessary to assure uniform pressure distribution of the coolant to all coolant-receiving nose pieces 33. If a plurality of pumps are used, the pump discharges can be spaced apart about the periphery of the inlet plenum radially beyond the nose pieces, which can then extend from the core support plate to the bottom wall of the inlet plenum with no intervening partitions to define intermediate chambers.

In the preferred embodiment heat exchanger 14 is a generally cylindrical annular structure surrounding the upper extremity of the core barrel 31 and extending upward therefrom. The outer wall of heat exchanger 14 is provided by the primary vessel 11, and the inner wall 38 of heat exchanger 14 serves to define the flow path for the primary coolant. As is conventional in counter-flow heat exchanger design, the heat exchanger 14 is provided with a tube assembly 39 for effecting heat transfer. The primary coolant flows downward in the heat exchanger shell about the exterior of the tubes while the secondary coolant flows in the opposite direction through the tubes themselves. An inlet header 41 and outlet header 42 are positioned at opposite extremities of tube assembly 39. Wall 38 of heat exchanger 14 is provided with a plurality of angularly spaced orifices 43 near the upper extremity of heat exchanger 14 just below header 42. The primary coolant enters the heat exchanger shell through the orifices 43 and travel downward once inside. A plurality of spaced-apart baffles 44 divert the flow of primary coolant within the heat exchanger to tube assembly 39 and generate turbulance for more effective heat transfer. Baffles 44 are positioned at intervals which do not appreciably increase the pressure drop through the heat exchanger.

The annular heat exchanger design of the preferred embodiment is advantageous for two reasons. First, it does not appreciably increase the overall height of the module. Second, it provides a greater spread between the hot and cold pools of coolants, thereby reducing the thermal stress in the primary vessel.

The heat exchanger 14 has an inlet 46 for a secondary coolant at its lower extremity and an outlet 47 at its upper extremity. Ducts 48 and 49 communicate with inlet header 41 through inlet 46 and with outlet header 42 through outlet 47, respectively. The ducts 47 and 48 penetrate the primary vessel 11 and the outer vessel 12 to provide fluid communication for the secondary coolant with the balance of the secondary cooling system.

The inlet and outlet ducts 48 and 49 are adapted at their ends for connection to the secondary cooling system, as will be described in more detail hereinbelow.

The primary vessel 11 is provided with a recessed head 51, which is of a generally cylindrical shape and overlies the reactor core unit 13. The recess extends from the top of the primary vessel down to an elevation just above the core barrel 31. The cylindrically shaped wall of head 51 and the inner wall 38 of heat exchanger 14 taken together define an annular region around the recessed head which defines a flow path for primary coolant from the top of the reactor core unit 13 to the inlets 43 into heat exchanger 14.

The primary coolant flow path from the bottom of heat exchanger 14 to the pump intake 18 is defined primarily by two coaxial cylindrical and annular shielding members 53 and 54. The member 53 surrounds the core barrel 31 and extends upwardly therefrom. The shielding member 54 is coaxial with member 53 and hugs the primary vessel 11. Taken together, the members 53 and 54 define an interstitial region between them through which the primary coolant flows to return to pump 16. Shielding members 53 and 54 are preferably composed of stainless steel.

It will be noted in FIG. 1A that the lower extremity of heat exchanger 14 is proximate the reactor core unit. In this configuration secondary coolant passing through the heat exchanger is subject to activation by the radial neutron flux emanating from the core. To prevent such activation from occurring, shield member 53 extends upward a significant distance above the reactor core unit and along the inner wall of heat exchanger 14, so as to block the flux of neutrons toward heat exchanger 14.

Having described the component elements of the primary cooling system, the complete coolant flow path can now be traced. The coolant enters the inlet plenum primary chamber 23 essentially at the pump head pressure and passes upward through the plurality of tubes 27 to high-pressure chamber 26. From chamber 26 the coolant enters the coolant-receiving nose pieces 33 and is forced upwards through the individual fuel assembly ducts 32. As the coolant enters the nose pieces 33, a small amount of seepage may occur around the seat of the nose pieces 33 on perforate plate 28 separating high-pressure chamber 26 from low-pressure chamber 24. This seepage assures the proper hydrostatic balance providing for hold-down of the core assemblies 32. The primary coolant receives heat as it travels through the fuel assembly ducts 32. At the top of the reactor core unit 13 the coolant is turned outward toward the peripheral region above core barrel 31. At that point the flow turns upward in the interstitial region defined by the recessed head wall and the inner wall 38 of heat exchanger 14. The primary coolant entering the heat exchanger through the angularly spaced orifices 43 and then travels downward and is deflected by baffles 44 to provide some cross flow through the tube assembly 39. The coolant then exits the heat exchanger into the annulus defined by shielding members 53 and 54 surrounding the core barrel 31. The coolant proceeds through openings in the support plate 29 into suction plenum 34 to pump intake 18.

The outer vessel 12 is preferably of a multiple-walled construction including a containment vessel 61 surrounded by a confinement vessel 62. Containment vessel 61 is preferably made of 304 stainless steel and contains an inert gas, for example, argon, in the interstitial region between containment vessel 61 and primary vessel 11. The argon is a safety feature. It provides an inert environment surrounding the primary vessel 11 in the event liquid sodium should leak through the primary vessel. Between the cylindrical walls of containment vessel 61 and confinement vessel 62 heat transfer is enhanced by a system of projecting fins 63 constructed and interleaved with one another in the same manner as fins 21 described hereinabove and similarly serving to enhance heat transfer to the outside in an emergency shutdown situation. In the embodiment of FIG. 1 the containment vessel 61 is joined with the wall of heat transfer vessel 19 surrounding pump 16. In the preferred embodiment the primary vessel 11 is 13 feet 4 inches in diameter and 63 feet in height. Containment vessel 61 is 14 feet in diameter and 65 feet in height. The upper region of the primary vessel 11 is preferably made of 316 stainless steel and has a pressure rating sufficient to suppress all potentially hazardous events. Containment vessel 61 is thinner and has a pressure rating sufficient to prevent leakage of radioactive materials to the outside.

Figure 3:
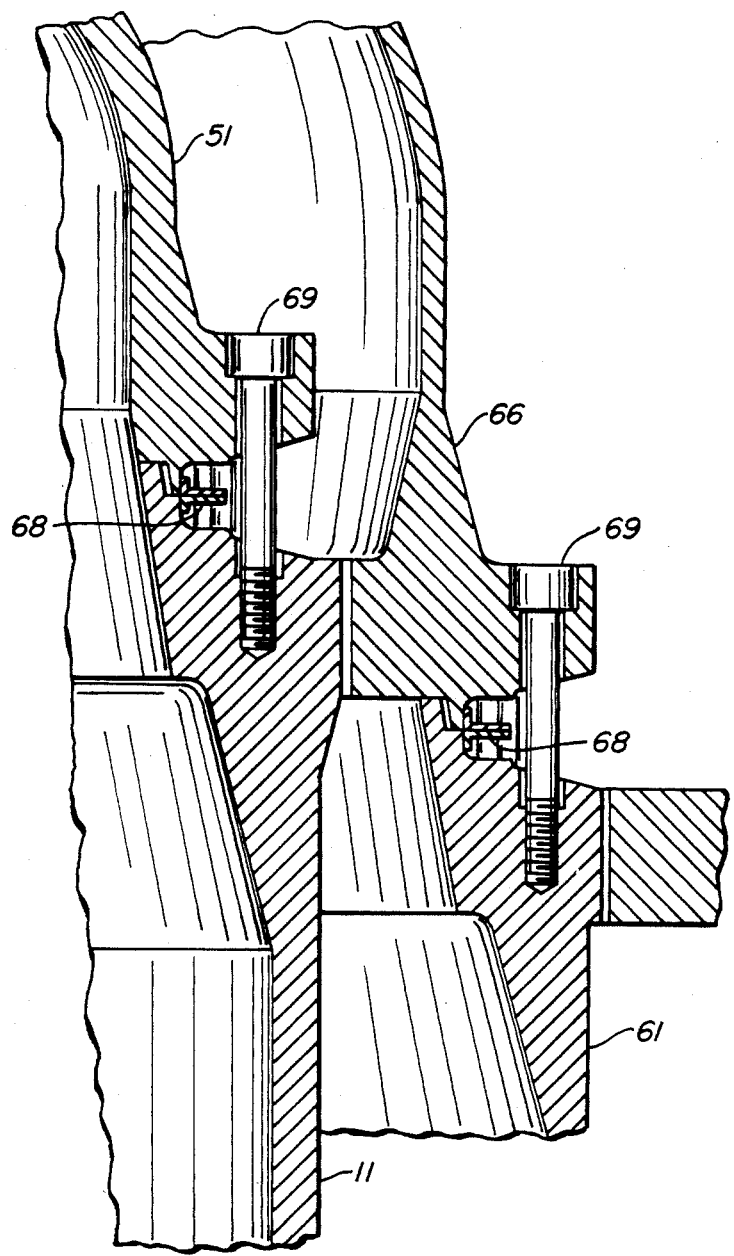
FIG. 3 is a sectional view showing an enlargement of the primary-vessel and containment-vessel head arrangement with sealing and attachment means.

Containment vessel 61 and confinement vessel 62 are provided with respective heads 66 and 67. The primary vessel head 51 and containment vessel head 66 are hermetically and removable secured to their respective vessels. The securement of the head assemblies may be seen in FIG. 3. The heads 51 and 66 are first hermetically sealed to their underlying vessels by an annular seal weld 68. The seal welds are formed by a pair of annular parallel projecting rims or flanges which can be welded together at their outer extremities. The heads are secured in addition by a plurality of bolts 69 extending through a flange on the respective heads. This arrangement provides for easy removal of heads for refueling. To remove the heads, the bolts 69 are removed and the seal welds 68 are cut. For reattachment after refueling, the seal welds can be rewelded to effect a new hermetic seal.

Figure 5:
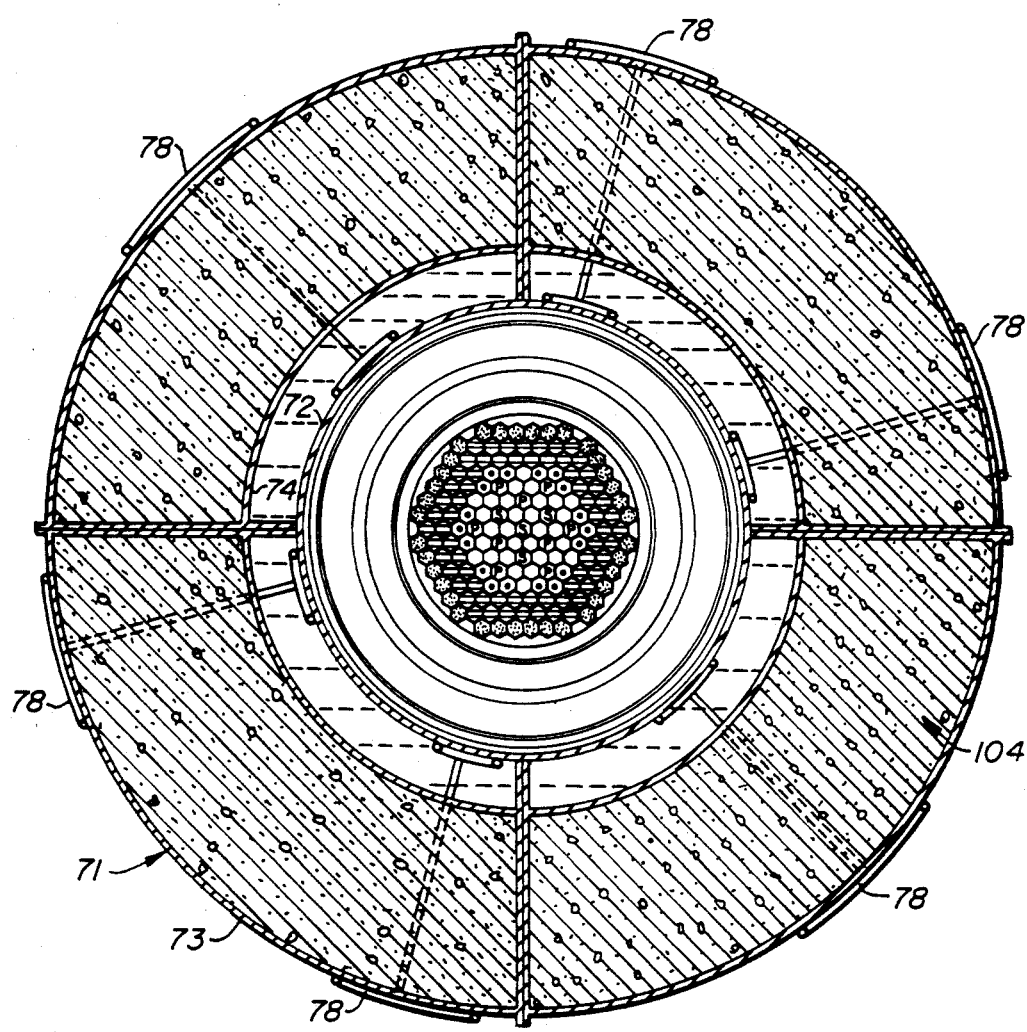
FIG. 5 is a cross-sectional view through the nuclear core unit along the line 5—5 of FIG. 1A.

It is an essential feature of the nuclear heat supply module that it be of a size which can be transported by railroad. Since the typical width of a railroad car is fourteen feet, the maximum permissible diameter of the nuclear heat supply module is on the order of fourteen feet. To meet this stringent size limitation while maintaining a large power output capacity, the nuclear heat supply module contains a fast-breeder reactor core unit. FIG. 5 shows a cross-sectional view taken through the active region of reactor core unit 13. The construction of the reactor core unit 13 is conventional for fast-breeder design. Unit 13 includes inner and outer core zones comprised of fuel assemblies having two different enrichments. In the preferred embodiment the inner core zone has a fissile content of about 17 percent and the outer core zone has a fissile content of about 24 percent. The core zones are surrounded by an axial blanket and a radial blanket of fertile material, typically depleted uranium. Beyond the radial blanket is a ring of stainless steel reflectors for reflecting neutrons back into the radial blanket.

The fissile and fertile fuel assemblies are housed within close-packed elongate hexagonal ducts. Primary and secondary control rods are guided into the active core region through similar ducts. The primary rods control the reactivity of the reactor, and the secondary rods provide the additional moderation needed for shutdown.

The contribution of the fast-breeder construction to the compactness of the heat supply module can be appreciated by comparison with typical thermal reactor design. In thermal reactors the fissile fuel preferentially absorbs relatively low-energy, slow neutrons. In a typical water-cooled reactor, for example, a large aggregate cross-sectional area of water is needed among the fuel assemblies to slow down the neutrons to the proper energy for absorption. Making the reactor more compact will diminish the amount of water available for slowing down the fission-inducing neutrons, and the core size and consequent power output must be reduced commensurately. The fast-breeder, in contrast, depends on a fast spectrum of neutrons for inducing fission, so that the need for additional moderation does not arise. Moreover, the radial blanket of fertile fuel, which is only present in a fast-breeder, provides additional shielding of the neutron flux from the core and also provides a supplementary heat to the primary coolant.

The nuclear heat supply module as described thus far can be entirely fabricated at a central factory. The module includes all critical nuclear components which are subject to nuclear safety inspection and certification. Because all critical nuclear components are being manufactured and assembled at a single location, it is economically feasible within the teachings of the present invention to assemble a staff of highly trained personnel at the factory for carrying out critical nuclear manufacturing processes.

Also fabricated at the central factory is a segmented shell for surrounding the nuclear heat supply module at the field site. The shell 71 may be seen already assembled about the nuclear heat supply module in FIGS. 1 and 5. Shell 71 is preferably manufactured as four separate quadrants, which can be assembled about the module in the field. Shell 71 includes inner and outer stainless steel cylindrical walls 72 and 73, respectively. The walls define an annular region between them which provides a form for pouring a concrete biological shield at the field site.

In the preferred embodiment shell 71 will also include a second, intermediate inner wall 74, which together with inner wall 72 defines a water jacket immediately surrounding the confinement vessel 62. In this embodiment it is the walls 74 and 73 which define the form for pouring the biological shield. The water jacket within the biological shield provides an additional emergency shutdown heat-removal capability. The jacket is vented to the atmosphere through vents 76 at the upper extremity of the water jacket. Heat delivered to the water from the nuclear heat supply module will thereby cause the water to boil. As the water is boiled away, it can readily be replenished to provide a continuing emergency heat-removal capability.

Shell 71 is also provided with a plurality of sealed tubular heat exchange loops 78, which are angularly spaced about the shell 71. Each of the heat exchange loops 78 includes a vertically extending inner serpentine branch secured to the inner wall 72 of the shell and a vertically extending outer serpentine branch secured to the outer wall 73 and exposed to the atmosphere outside the shell, as can be seen in FIG. 1. The inner and outer serpentine branches are connected by radially extending tubular portions at their upper and lower extremities. Each of the serpentine branches defines a heat exchange area. In the assembled reactor with shell, the inner area is disposed intimate to the outer wall of the confinement vessel, and the outer area is disposed at the outer wall of the shell. Each heat exchange loop 78 is filled with water and is permanently sealed together with an expansion tank. In the event of a scram condition the water in each heat exchange loop 78 will circulate due to free convection, thereby carrying heat from the confinement vessel wall to the outside. The heat exchange loops 78 are permanently affixed to the shell at the factory, typically 8 to 12 loops being secured to each quadrant. The heat exchange loops 78 shown in FIG. 5 have been enlarged for purposes of illustration.

The cartoon series shown in FIGS. 7A–D illustrates the process for assembling a nuclear generating unit as taught by the present invention. In the first step, illustrated in FIG. 7A, a nuclear heat supply module, including all critical nuclear components which are subject to certification requirements, is assembled at a central factory. FIG. 7A shows an exploded view of the elements as they leave the factory. The nuclear heat supply module itself includes a body portion 81, a recessed primary vessel head 82 containing the control drive mechanisms within the recess, a containment vessel head 83, a confinement vessel head 84, and separate shell segments 85 for assembly about the heat supply module. The heads 82, 83, and 84 are bolted at the factory for transit. The heads 82 and 83 will eventually be seal-welded at the site, but this does not occur at the factory. As graphically illustrated in FIGS. 7B and 7C the fully assembled and certified nuclear heat supply module and the shell segments are shipped separately by railroad car to the field location. In the field the shell segments are assembled about the nuclear heat supply module, and a cementatious mixture is poured into the annular region defined by the assembled segment, as illustrated in FIG. 7D.

Assembly of the nuclear generating unit at the field location may be better understood by reference to FIG. 8, which shows a plan view of a large-scale commercial generating installation according to the invention. The prefabricated nuclear heat supply module and the shell segments are delivered to the site in horizontal position along railroad track 91. The site is provided with a module assembly area 92 adjacent to track 91. As preliminary step structural support members of a conventional type are erected at the module assembly area 92, and the nuclear heat supply module and shell segments are unloaded and raised into vertical position, stabilized by the structural support members. As it is unloaded, the nuclear heat supply module is positioned in operative association with a transport means such as an air-lift pad 93 to provide for mobility of the assembled unit. Such air-lift pads are of known construction and are not described here. At the assembly area a cementatious material is poured into the form provided by the segmented shell assembled about the module and allowed to cure to provide a biological shield. At the same time a biological-shield cap is also poured. After the material is cured, the air-lift pad is pressurized, and the module is moved to transfer aisle 94 by means of a motor-driven winch.

A reactor service building 96 includes a vehicle bay 97, accessed by railroad, for receiving new fuel assemblies and the like. At the opposite side of reactor service building 96 is a similar vehicle bay 98 for shipping spent fuel assemblies, solid radioactive wastes, and the like. The central portion of the reactor service building 96 includes enclosures 99 for positioning individual assembled modules for refueling. A refueling and storage cell is positioned above the module and is adapted to be coupled and sealed to the module. The reactor service building 96 is provided with the conventional safeguards against contamination, deterioration, and accidental release of radioactive particulates and gas to the environment. The reactor service building includes complete refueling facilities and standard safety precautions, such as appropriate air locks between the receiving bay and the refueling and storage cells.

FIG. 8 shows five modular nuclear reactors 100 which have been completely assembled, loaded with nuclear fuel, and positioned at reactor stations 101 proximate electric-power generating means 102. Generating means 102 will generally be provided by a conventional steam turbine, or a plurality of steam turbines, with an associated secondary heat exchange cycle. The inlet means and outlet means of each assembled reactor 100 are coupled to the generating means 102 through the secondary heat exchange cycle. FIG. 4A provides a cross-sectional view of the coupling between a modular reactor 100 and the secondary heat exchange cycle associated with the electric-power generating means 102. Secondary-coolant outlet means 49 passes through biological shield 104 and the outer wall of shell 71. The outlet means 49 illustrated in FIG. 4A includes an inner conduit for the flow of liquid sodium and an outer guard conduit surrounding the inner conduit and defining an interstitial region between the two. As is conventional, the interstitial region between the two conduits is filled with an inert gas, for example, argon, as a safety precaution. Outlet means 49 (as well as inlet means 48) is provided with a clamped ring 106 and an annular seal weld 107 encircling the inner conduit for coupling to the balance of the generating facility. FIG. 4B shows an enlargement of the clamped ring and seal weld arrangement.

FIG. 9 shows an elevational view of an alternative installation according to the invention. This installation includes a module assembly area 111, transfer aisle 112, and reactor service building 113. The arrangement of FIG. 9 differs from that of FIG. 8 in that the assembled modular reactor units are positioned at reactor stations 114 within the reactor service building 113. The stations 114 are disposed so that a modular reactor can be coupled to the secondary heat exchange cycle of the generating means and can also be refueled and serviced from the same location. The upper portion of reactor service building 113 illustrated in FIG. 9 includes a gantry crane 116 which is movable in two directions to service the modular reactors positioned below.

The modular reactors are refueled in accordance with the present invention as follows. First, the individual modular reactor to be refueled is shut down and taken off line while the other modular reactors continue to operate so that the continuous generation of electric power is not interrupted. The guard pipe surrounding the liquid-sodium conduit is opened and the conduit is disconnected from the balance of the plant by removing the clamp ring 106 and cutting the seal weld 107. The liquid sodium is drained in a manner well known to those skilled in the art. In the embodiment of FIG. 8 the air-lift pad under the modular reactor unit is pressurized, and the unit is transported to the reactor service building. This step is not needed in the embodiment of FIG. 9. Within the reactor service building the concrete shield plug and the confinement head are removed, and the seal weld on the containment head is cut. After the containment head is removed the seal weld on the primary vessel head is similarly cut, and the primary vessel head with the control rod drives is removed in a similar manner. These operations may be performed remotely or manually by use of temporary air locks utilizing conventional techniques. Removal of the spent fuel elements and loading of the new fuel is then carried out in conventional open-head manner. After refueling, the primary vessel head is replaced, and the seal re-welded and bolted. The space above the sodium within the primary vessel is purged and backfilled with inert gas. The containment vessel head is secured in place by seal-welding and then bolting, and an inert gas is injected into the interstitial region between the primary vessel and the containment vessel. The confinement head is then bolted into position and the biological shield plug is placed in position. In the embodiment of FIG. 8 the modular reactor is then transported to its reactor station, this being unnecessary in the embodiment of the FIG. 9. Heated liquid sodium is then returned to the secondary coolant system in conventional manner, and the secondary coolant inlet and outlet means are recoupled to the balance of the plant.

An important aspect of the modular reactor design is its capability for passive dissipation of heat in the event of an emergency. If the power for controlling the reactor should fail, the control rods will be actuated by gravity to shutdown the core. Shutdown heat removal is provided for in two ways. If the primary cooling system is lost, but the secondary cooling system continues to operate, the heat sink provided by the energy-generation means in the balance of the plant will provide for sufficient shutdown heat removal. If both the primary system and secondary system are lost, heat removal is provided for in a passive manner by radiation and convection through the containment vessel walls to the external environment. Heat transfer between the containment vessel 61 and confinement vessel 62 is considerably enhanced by the system of fins 21 and 63. The free-convection heat exchange loops 78 then transfer the heat from the outer wall of confinement vessel 62 to the atmosphere surrounding the modular unit. Although the heat exchange loops 78 provide the main means for transferring heat from the confinement vessel to the atmosphere, the large mass of the biological shield 104 also provides an available heat sink. As a final safety precaution, the water jacket defined by the concentric walls 72 and 74 of shell 71 provides an additional heat sink. Because the water jacket is vented to the atmosphere, heat transfer to the water by conduction from the confinement vessel will first raise the water temperature to the boiling point and then pass into heat of vaporization. As the water is boiled away, the supply can be replenished through vents 76.

The water jacket not only provides an additional heat sink, but also preserves the integrity of the biological shield. If the concrete is allowed to overheat, it can turn to powder over a period of time. The vented water jacket, however, prevents the temperature of the concrete from rising above the boiling point of water.

When the modular reactor unit is operating normally, the passive shutdown heat-removal systems are expected to carry away less than 0.3 percent of the unit's full power rating. As the temperature rises in a scram condition, the capacity of the passive systems to radiate away waste heat increases as the fourth power of the temperature in accordance with the well known Stefan-Boltzmann law, thereby providing for significant waste heat removal at the higher temperatures of a shutdown condition, but not interfering with the unit's efficiency under normal operating conditions.

Figure 6:
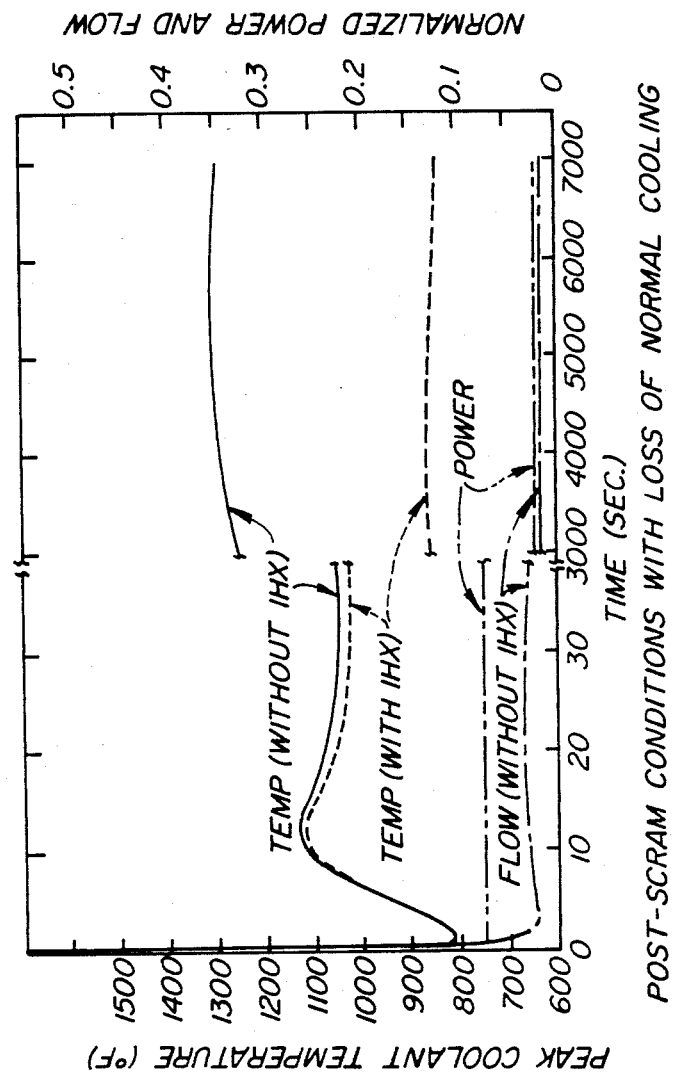
FIG. 6 is a graph showing post coolant temperature profiles.

FIG. 6 demonstrates the expected performance of the shutdown heat removal system upon the occurrence of a scram condition. The expected temperature under normal operating conditions is slightly greater than 800° F. The solid line, labeled "WITHOUT IHX," represents the expected temperature of the liquid sodium leaving the core following scram with a concurrent loss of the primary cooling system pump and the heat rejection capacity of the intermediate heat exchange mechanism. It is seen that the temperature is expected to rise gradually to a maximum of about 1300° F., which is a tolerable temperature. The dashed line, labeled "WITH IHX," represents the temperature expected if the intermediate heat exchange mechanism remains intact. It is seen that the temperature gradually decreases after an initial upsurge to about 1100° F.

When a modular nuclear reactor constructed in accordance with the invention has been scrammed, it need merely be transported away from its reactor station and allowed to sit in the field until it cools off. Because of the passive nature of the shutdown heat removal system, the scrammed reactor does not need to be connected to any auxiliary systems for emergency treatment. It can be left sitting in the field for an indefinite period until the radioactive contamination within the primary vessel has diminished to a manageable level. Sufficient shielding is provided by the construction of the nuclear heat supply module itself and its surrounding biological shield so that no radioactive contamination of the atmosphere is to be expected. In the meantime, a new modular unit can be installed in place of the incapacitated one, and the generating facility will remain operational.

While the above provides a full and complete description of the preferred embodiments of the present invention, various modifications, alternate constructions, and equivalents may be employed without departing from the true spirit and scope of the invention. Therefore, the above description and illustrations should not be construed as limiting the scope of the invention, which is defined by the appended claims.

What is claimed is:

1. A transportable prefabricated fast-breeder nuclear heat supply module for shipment to and erection at an electric-power generating facility comprising:
    a primary vessel having a removable recessed head including a cylindrical wall;
    an outer vessel surrounding said primary vessel and close-coupled thereto to define an interstitial region therebetween, said outer vessel having a removable head and having dimensions sized for shipment on a railroad car;
    a fast-breeder reactor core unit mounted within said primary vessel, said reactor core unit including a plurality of control rods;
    a heat exchanger of cylindrical annular shape mounted within said primary vessel and having an outer cylindrical wall in common with said primary vessel, said heat exchanger having an inlet and an outlet for secondary coolant;
    inlet means and outlet means communicating through said outer and primary vessels with said heat-exchanger inlet and outlet, respectively, said inlet means and said outlet means being adapted for connection to a secondary cooling system;
    a pump mounted within said primary vessel underneath the reactor core unit for pumping a primary coolant upwardly through said reactor core unit and said heat exchanger;
    first means defining an inlet plenum positioned intermediate the pump and the overlying reactor core, said pump and said reactor core unit communicating directly with said intermediate inlet plenum to define a direct upward primary coolant flow path from said pump to said reactor core unit;
    second means defining a primary coolant flow path from said reactor core unit to said heat exchanger including an inner cylindrical wall of said heat exchanger and said cylindrical wall of said recessed head, whereby said heat exchanger serves to isolate said primary coolant from said primary vessel to reduce thermal stress in said primary vessel, said heat exchanger providing a downward flow path for said primary coolant in counterflow to a secondary coolant, and third means defining a primary coolant flow path from said heat exchanger to an inlet of said pump mounted underneath the reactor core, said third means including a first shielding member surrounding said reactor core unit and extending upward therefrom thereby to shield said heat exchanger from said reactor core unit, and a second shielding member interiorly lining a portion of said primary vessel, said second means and said third means being devoid of piping; and
    a control rod drive unit mounted within the recess defined by said recessed head and operatively connected through the bottom of said recessed head to said control rods;
    whereby primary coolant will be contained entirely within said primary vessel and said nuclear heat supply module will be in fluid communication with the balance of said electric-power generating facility only through said secondary coolant inlet means and outlet means.

2. The nuclear heat supply module of claim 1, wherein said reactor core unit comprises a plurality of nuclear fuel assembly ducts and wherein said first means defining said inlet plenum includes a perforate support plate for supporting said reactor core unit, said fuel assembly ducts seating in the perforations of said support plate, and said reactor core unit further including a plurality of tubular coolant-receiving members in communication with said fuel assembly ducts and passing through said perforations into said inlet plenum, whereby high pressure primary coolant passes from said inlet plenum to said fuel assembly ducts.

3. The nuclear heat supply module of claim 1, wherein said primary vessel head and said outer vessel head are adapted to be hermetically resealable to their respective vessels.

4. The nuclear heat supply module of claim 1, wherein said outer vessel comprises a containment vessel and a confinement vessel surrounding said containment vessel and close-coupled thereto to define an interstitial region therebetween, said primary vessel, said containment vessel, and said confinement vessel each having a removable head, said primary vessel head and said containment vessel head being adapted to be hermetically resealable to their respective vessels.

5. The nuclear heat supply module of claim 1, wherein said pump is provided by an electromagnetic pump for circulating a liquid metal primary coolant.

6. A transportable prefabricated fast-breeder nuclear heat supply module for shipment to and erection at an electric-power generating facility comprising:
    a primary vessel, a containment vessel surrounding said primary vessel, and a confinement vessel surrounding said containment vessel, said containment vessel being close-coupled to said primary vessel to defne a first interstitial region therebetween and said confinement vessel being close-coupled to said containment vessel to define a second interstitial region therebetween, said confinement vessel having outer dimensions sized for shipment on a railway car;

a fast-breeder reactor core unit mounted within said primary vessel and including a plurality of control rods;

a counterflow heat exchanger mounted within said primary vessel and extending about said reactor core unit, said heat exchanger having a first wall in common with said primary vessel, said heat exchanger having an inlet at a lower extremity thereof and an outlet at an upper extremity thereof for secondary coolant at said first wall;

inlet means and outlet means communicating through said confinement and containment vessels with said heat exchanger inlet and outlet, respectively, said inlet means and said outlet means being adapted for connection to a secondary cooling system;

an electromagnetic pump mounted within said primary vessel directly underneath the reactor core unit for pumping a liquid metal primary coolant upwardly through said reactor core unit and said heat exchanger;

first means defining an inlet plenum positioned intermediate the pump and the overlying reactor core unit, said pump and said reactor core unit communicating directly with said intermediate inlet plenum to define a direct upward primary coolant flow path from said pump to said reactor core unit;

wherein a second wall of said primary vessel and a third wall of said heat exchanger define a flow path for said primary coolant from said reactor core unit to said heat exchanger, said third wall having an inlet at an upper extremity thereof for primary coolant and to provide a downward flow path for said primary coolant through the heat exchanger in counterflow to a secondary coolant;

and wherein a fourth wall and a fifth wall define a flow path for said primary coolant from a lower extremity of said heat exchanger to an inlet of said pump mounted underneath the reactor core unit; and a control rod drive unit mounted within said containment vessel outside said primary vessel and operatively connected through said primary vessel to said control rods;

whereby said primary coolant flows upward through said reactor core unit and to the upper extremity of said heat exchanger, and downward through said heat exchanger and to said pump inlet in a flow path devoid of piping and said nuclear heat supply module is in fluid communication with the balance of said electric-power generating facility only through said secondary coolant inlet means and outlet means.

7. The nuclear heat supply module of claim 6, wherein said primary vessel, said containment vessel, and said confinement vessel are of a generally cylindrical shape, said confinement vessel having a diameter not exceeding 14 feet and a length not exceeding 70 feet, whereby said nuclear heat supply module will not exceed the maximum dimensions transportable by railway car.

8. The nuclear heat supply module of claim 7, wherein said heat exchanger has a generally cylindrical annular shape and wherein said primary vessel has a generally cylindrical recessed head, said second and third walls defining said primary coolant flow path being provided, respectively, by the inner wall of said annular heat exchanger and by the cylindrical wall of said recessed head.

9. The nuclear heat supply module of claim 8, wherein said recessed head is removable and is adapted to be hermetically resealable to said primary vessel, said control rod drive unit being mounted within the recess of said head and communicating through a wall of said head for operative connection with said control rods.

10. The nuclear heat supply module of claim 9, wherein said containment vessel has a removable head adapted to be hermetically resealable to said containment vessel, and said primary vessel head and containment vessel head are each provided with means for introducing inert gas into said primary vessel and into said first interstitial region, respectively.

11. The nuclear heat supply module of claim 8, wherein said first means defining said inlet plenum includes a support plate for supporting said reactor core unit and coolant-receiving means communicating with said reactor core unit through said support plate and with said inlet plenum, whereby high-pressure coolant passes directly from said inlet plenum through said reactor core unit.

12. The nuclear heat supply module of claim 11 wherein said reactor core unit includes a plurality of fuel assembly ducts and said coolant-receiving means includes a plurality of coolant-receiving members in fluid communication with said fuel assembly ducts and wherein said pump has a high-pressure discharge centrally disposed beneath said reactor core unit, said first means including means defining a primary chamber for receiving primary coolant from said high-pressure discharge and means defining a distribution path from said primary chamber to said coolant-receiving members, whereby said coolant is distributed uniformly from said high-pressure discharge to said coolant receiving members.

13. A segmented shell for assembly about a nuclear heat supply module comprising:

a nuclear heat supply module having an outer wall;

a plurality of shell segments adapted to be joined to one another in surrounding relation to said nuclear heat supply module, the joined shell segments defining an inner wall immediately adjacent the outer wall of said nuclear heat supply module, an outer wall spaced apart from said inner wall and an intermediate wall spaced apart from said inner and outer walls to define therebetween an inner interstitial region providing a water jacket and an outer interstitial region for receiving a cementatious material;

a plurality of heat exchange loops secured to said segments, each loop having an inner branch defining a first heat exchange area disposed at the inner wall of the shell segments for placement intimate to the outer wall of said heat supply module and an outer branch defining a second heat exchange area disposed at the outer surface of said segmented shell outer wall;

whereby said segmented shell when assembled about said heat supply module provides a form for the pouring and curing of a biological shield of cementatious material and said heat exchange loops provide an emergency heat removal system.

14. The segmented shell of claim 13 wherein said heat exchange loops are provided by free-convection loops to provide passive emergency heat removal from said nuclear heat supply module.

15. The segmented shell of claim 14, wherein said inner and outer branches of said heat exchange loops are provided by tubular members having vertically extending serpentine configurations joined at the upper and lower extremities thereof by tubular portions traversing said interstitial region thereby to provide passive free-convection circulation of coolant within said loops.

16. The segmented shell of claim 13 wherein the joined shell segments further define an intermediate wall between said inner and outer walls, said intermediate wall and said inner wall forming a water jacket about said nuclear heat supply module.

17. The segmented shell of claim 16 further including means venting said water jacket to the exterior of said shell.

18. A modular nuclear reactor comprising:
a primary vessel having a removable recessed head;
an outer vessel surrounding said primary vessel and close-coupled thereto to define a first interstitial region therebetween;
a reactor core unit mounted within said primary vessel, said reactor core unit including a plurality of control rods;
a heat exchanger mounted within said primary vessel, said heat exchanger having an inlet and an outlet for secondary coolant;
inlet means and outlet means communicating through said outer and primary vessels with said heat exchanger inlet and outlet, respectively, said inlet means and said outlet means being adapted for connection to a secondary cooling system;
a pump mounted within said primary vessel directly underneath the reactor core unit for pumping a primary coolant upwardly through said reactor core unit and said heat exchanger;
first means defining an inlet plenum positioned intermediate the pump and the overlying reactor core unit, said pump and said reactor core unit communicating directly with said intermediate inlet plenum to define a direct upward primary coolant flow path from said pump to said reactor core unit;
second means defining a primary coolant flow path from said reactor core unit to said heat exchanger and downwardly therethrough in counterflow to an upwardly flowing secondary coolant, and third means defining a primary coolant flow path from said heat exchanger to an inlet of said pump mounted directly underneath the reactor core unit, said second means and said third means being devoid of piping; and
a control rod drive unit mounted within the recess defined by said recessed head and operatively connected to said control rods;
an annular shell surrounding said outer vessel, said shell having an inner wall adjacent the outer wall of said outer vessel and an outer wall spaced apart from said inner wall to define therebetween a second interstitial region;
a plurality of heat exchange loops, each having an inner branch defining a first heat exchange area disposed intimate to said outer vessel outer wall and an outer branch defining a second heat exchange area disposed at the outer surface of said segmented shell outer wall thereby to provide emergency heat removal from said nuclear reactor; and
a hardened cementatious material within said second interstitial region providing a biological shield for said nuclear reactor;
wherein said secondary coolant inlet means and outlet means extend through said biological shield and said annular shell to provide fluid communication between said modular reactor and the balance of an electric-power generating facility.

19. The modular reactor of claim 18, further comprising transport means in operative association with said reactor for transporting said reactor into and out of position for coupling to said electric-power generating facility.

* * * * *